Patented May 27, 1941

2,243,420

UNITED STATES PATENT OFFICE 2,243,420

LUBRICATING COMPOSITION

Per K. Frolich, Westfield, N. J., assignor to Standard Oil Development Company, a corporation of Delaware No Drawing. Application March 11, 1939, Serial No. 261,314

15 Claims. (Cl. 252—55)

The present invention relates to the preparation of high grade lubricating oils for use in internal combustion engines and for similar service and, particularly, for use in "breaking in" new engines. My invention will be fully understood from the following description of the oils and their characteristics and methods of manufacture.

In the past there has been an appreciation of the fact that various substances when incorporated into mineral oils increase their oiliness and general value as lubricants, for example, by increasing their load bearing capacity and by reducing friction, but such information has been very limited and heretofore little, if any attention has been paid to the effect of such compounding agents on different bearing metal combinations. I have found that the bearing metal combination is of the utmost importance in respect to addition agents. For example, I have found that certain addition agents may be of great value for say, steel to steel bearings and, at the same time, to be of great detriment to other combinations, for example, aluminum to steel or to cast iron.

My present invention deals with oils which are to be used in automobile engines or in similar service where a high degree of efficiency must be met with several different bearing metal combinations. In the following description the term bearing includes not only journals but any other cases in which metal surfaces move against one another. At the present time at least two, and generally three, or more different metal combinations are used in practically every internal combustion engine now manufactured, and practical considerations make it absolutely necessary that the same oil be used in all of these different bearings. Furthermore, all of the manufacturers must market an oil which will be satisfactory in the great majority of engines manufactured at the present time. It will be readily understood, therefore, that the oil must have a universal character, that is to say, it must be capable of excellent service in substantially any type of bearing combination to be encountered. For practical purposes it is necessary that the oil give a high average performance when used with the following bearing combinations:

Steel to bronze (wrist pins and bushings)
Steel to aluminum (cylinders and aluminum pistons)
Steel to babbitt (main bearings and crank shaft bearings)
Steel to cast iron (valves)
Cast iron to cast iron (pistons and cylinder walls)
Cast iron to aluminum (pistons and cylinder walls)

The oils to be described below are not only of great value for general lubricating purposes in internal combustion engines and in other instances where similar requirements exist, but they are of particular value in "breaking in" oils. New or "green" engines, just as an example, require careful running for several hundred miles; generally 500 or 1,000 miles is considered necessary. The purpose of this is to gradually wear down high spots, tool work and other similar irregularities, and to avoid danger of seizure or bad scoring. My oils are admirably fitted for this service because of the high film strength produced and of the low friction developed, and this is characteristic of all of the types of bearings likely to be met with in actual practice. My oils are also generally satisfactory for upper cylinder lubrication, the highly refined oils being much more suitable for this purpose and the ester blend is then added directly to the gasoline tank just as the unblended oil is now used.

In the following description my oils are described generally as motor oils, but it should be understood that they may be used for many other purposes and particularly as indicated above, where the same oil must be used with several different bearing metal combinations.

In my study of the effect of different addition or compounding agents on different bearing metal combinations, I have found that while a particular agent may give excellent results with respect to some particular bearing combination, it may at the same time be a great detriment in the case of some other. As an example of this I cite the use of chlorine-containing oils, for example mineral oil containing small quantities of carbon tetrachloride, say 2 to 3% or more. Such an oil when used in a bearing combination of steel to steel shows a load bearing capacity of 25,000 pounds and a friction value of 75 to 80 foot pounds as determined on the Mougey machine referred to below. The same oil base without the compounding agent carried a load of only 3,000 pounds and gave a frictional value of 32 foot pounds. Thus, it will be seen that the chlorine compounds, of which carbon tetrachloride may be taken as typical, are extremely good for use with steel to steel bearings, but if a bearing of steel to lead bronze is used the uncompounded mineral oil carried a load of 25,000 pounds and gave a frictional value of 55 as compared with 16,000 and 88 pounds, respectively, for the same oil containing the chlorine compound. From this it will be seen that the straight mineral oil is better than the compounded oil in the case of steel to bronze and comparing both tests it will be noted that the chlorine compounds greatly increased the lubricating value of the oil with respect to steel and steel combinations while it was a substantial detriment in the case of bronze to steel.

I wish to point out at this time that too much attention should not be given to the fact that one type of bearing is capable of standing a far greater load than some other type of bearing. Bearings may always be designed to carry the particular load required. If the addition agent produces higher load bearing capacity the size of the bearing may be greatly decreased which is, of course, an advantage. But the danger in such cases is that an addition agent may be added which will greatly decrease the film strength in respect to some particular bearing below that of even the uncompounded oil so that the bearing surface might be much smaller than would be actually required. In "breaking in" service this becomes of even greater importance since, due to the slight irregularities in manufacture, there are high spots and tool marks in the bearings which consequently carry much greater loads than the bearing was ever designed for.

An improved compounding agent should thus be one which preferably increases the load bearing capacity in all cases, produces the least friction possible, and if this is not possible with all bearings, then it is at least necessary that it should not in any case reduce the load bearing capacity for any particular bearing combination.

Many types of blending agents other than chlorine-containing oils have been suggested such as sulphur-containing oils, soaps, acids such as fatty acids and the like, and I have tried a great many of these but I found that esters are far the most desirable agents, that they are equal in almost every case to the best results obtained with any other compounding agent on any particular bearing, while at the same time in no observed case did they prove to be a detriment in respect to load bearing capacity, or otherwise.

The esters which I used are in general those having a boiling point above 150° C. (302° F.) and preferably above 180 or 200° C. These esters are preferably normally liquid, although solid ones may be used in small amounts. For the preparation of these esters, the acids produced by the known process of oxidizing paraffin wax at temperatures from about 100 to 160° C. with air or oxygen, or with other agents such as nitric acid with or without catalysts are of especial value being cheap and readily obtainable in a comparatively pure state, that is to say, substantially free of those substances which occur in vegetable or animal oils and which are detrimental to lubricating properties. The following is an analysis of a typical sample of acids that I have in mind.

Saponification number 252 mg. KOH per gram.
Acid number 200 mg. KOH per gram.
Non-saponifiable material 3.2%.

The unsaponifiable material is largely unoxidized oil which is, of course, without any undesirable effect on the lubricant. These acids are substantially free of aldehydes and other sludging constituents formed in the oxidation of petroleum oils at higher temperatures in the vapor phase.

These acids may be obtained, for example, by blowing air through the melted wax in the presence of suitable catalysts such as potassium permanganate and other manganates and permanganates of the alkali metals or ammonium. For example, a suitable method of preparing such acids is as follows. Crude scale wax derived from petroleum is melted and an aqueous solution containing 0.1% of potassium permanganate and 0.068% of soda ash (based on the weight of the wax) is mixed therewith while heating to a temperature of 110° C. Air is then forced through this mixture at a rate of 0.21 cubic meters per hour per kilogram of wax for 18 hours, maintaining the temperature at 110° C., until the unsaponifiable content of the mixture is reduced to 65%. The oxidized wax acids are obtained in a crude state by neutralizing the oxidation products with aqueous alkali at a temperature of about 170° C. and a pressure of about 100 pounds per square inch gauge. The resulting water solution of the soaps is separated from the water insoluble material and the aqueous solution is then extracted with 54° Baumé naphtha to remove unsaponifiable material from the soap solution, while adding a small amount of isopropyl alcohol to prevent emulsification. The aqueous soap solution is then acidified with dilute sulfuric acid to set free the wax acids. These are dried and then fractionated by distillation under vacuum. The fraction distilling with steam between 150 and 280° C. at an absolute pressure of 8 to 12 mm. of mercury has characteristics similar to the typical sample described above and may be used to prepare esters for use according to the present invention.

The materials to be oxidized may consist of paraffinic mineral waxes and materials containing such waxes in substantial, preferably major proportions such as paraffin wax, crude scale wax, petrolatum, de-oiled petrolatum, sweater oil and the like.

As to the alcoholic group used for preparing the esters, the aliphatic alcohols are generally to be preferred not only because of their cheapness and availability but also because their esters are generally better colored and more stable. Ethyl and methyl alcohols are suitable when combined with acids obtained by the oxidation of paraffin so as to have boiling points above 150° C. as indicated above. Normal propyl or isopropyl alcoholic esters are also useful when combined with the oxidized wax acids producing esters of the proper boiling point, while alcohols such as normal butyl or secondary butyl or the amyl alcohols may also be used.

Dibasic alcohols, the glycols, can be combined also with the oxidized paraffin acids and make valuable addition products. Similarly, the glyceryl esters may be used, but they as well as the glycols should be produced synthetically so as to avoid the presence of non-fats, resins, albuminoids, and the like which naturally occur in all products of vegetable and animal origin. I recognize the fact that natural fats and fatty oils have been used before as compounding agents but these materials, as indicated above, are always contaminated to a slight extent with impurities naturally contained in the animal or vegetable bodies from which they are derived, and these impurities even in small amount prove undesirable in lubricating oils, since these cause sludging and, for reasons little understood although probably connected with the stability of the oil, do not give wholly satisfactory motor operation. Furthermore, natural fats and fatty oils cause a darkening in color and possess poor oxidation characteristics which are not found in the synthetically produced substances and which are undesirable for the highly refined, non-sludging oils now in demand. Suitable esters for use in this invention may also be formed by combining the oxidized wax acids with aralkyl alcohols such as benzyl alcohol or with phenol or other hydroxy aromatic compounds such as cresol, toluol, butyl phenol, resorcinol, hydroquinone, naphthol and the like which may contain other groups also attached to the aromatic ring, such as alkyl, oxy, nitro, amino or sulfur-containing groups.

It should be understood that I have a distinct preference for mono-alcoholic esters preferably esters of saturated aliphatic alcohols and the oxidized wax acids and if the glycol or glyceryl esters are to be used they should be produced synthetically. These esters are preferably those containing only the elements carbon, hydrogen and oxygen although esters containing other elements may be used, such as those containing nitrogen or nitro or amino groups. The esters may be produced synthetically by any particular method. The usual method of esterification using acids and alcohols may be used but other methods in which, for example, acid chlorides are used are satisfactory, and any other suitable synthetic method may be used since in all of these cases the presence of the impurities naturally occurring in fats and vegetable products is avoided.

Some of these esters are difficultly soluble in mineral oil but usually they can be brought into solution by addition or stabilizing agents for examples by mixing with another and more soluble ester, oil, or the like.

For purposes of general motor lubrication the esters may be used in relatively large amounts say up to 10 or 15% or even higher, but much smaller amounts are actually required and I have found that extremely good results are obtained with as little as 1%. In general for ordinary lubricating purposes 0.1 or 0.25 to 2% or 2½% may be used and an excess over this amount generally does not produce correspondingly increased film strengths. The oils used are preferably well-refined, mineral oils of viscosity from about 45 to 150 seconds Saybolt at 210° F. The actual amount of the ester used must to some degree be determined by the particular service required and the grade of oil used, but the optimum amount can be readily determined by experiment. Oils heavier than 150 seconds Saybolt may be used in some instances although generally not for internal combustion engine lubrication.

For special "breaking in" service I prefer to use a base oil somewhat lighter and less viscous than the ordinary lubricating oils for general service and, furthermore, I prefer to include a slightly greater quantity of the ester, for example, 2 to 4% or 5½% is satisfactory in an oil having say 45 to 60 or 80 seconds Saybolt at 210° F. for "breaking in" ordinary automobile engines. Where truck or other heavy engines are used I would recommend a somewhat heavier oil say having a viscosity of 60 to 70 or perhaps 100 seconds Saybolt at 210° F.

The following tests and examples will further indicate the composition and general characteristics of my oils:

MOUGEY TESTS

The following tests were carried out under strictly comparative conditions on the Mougey machine. For a description of this machine and the method of testing, see National Petroleum News, November 11, 1931, page 47, Mougey and Allman. A mineral oil of the following composition was selected as the base.

Gravity_____ 27.7 A. P. I.
Flash_____ 410° F.
Fire_____ 475° F.
Viscosity at 210° F._____ 50 seconds Saybolt
Viscosity at 100° F._____ 288 seconds Saybolt When this oil was tested on the Mougey machine using different metal combinations it showed up well in the cases of steel to lead bronze, cast iron to cast iron, but it did not prove entirely successful in the case of steel to aluminum or cast iron to aluminum or steel to steel. When 2% of carbon tetrachloride was added to the oil it was entirely unsatisfactory in the case of steel to bronze bearings and cast iron to cast iron. The same base oil with say 2% of oleic acid (which may be taken as typical of the organic acids) gave good results in most cases but the results were far inferior to the straight mineral oil in the case of steel to bronze, in that much greater friction was developed at all loads and the difference was much more pronounced at higher loads. For example, at a load of 2000 pounds the friction was about twice as great in the case of the acid blend as in the case of unblended mineral oil.

A sulfur compound produced by cooking sulfur with paraffin wax and dispersing about 2% of the mixture in the base oil used above was suitable in bearing combinations of steel or cast iron to aluminum, but signally failed in the case of steel to bronze, and cast iron to cast iron.

Sperm oil, or lard, or fish oil and other animal or vegetable blends gave close results in all cases and they were substantially better than the straight mineral oil in practically all cases.

To compare with the above oils a blend was made up with 2% of an ester produced by the reaction of isopropyl alcohol and an acid obtained by the oxidation of paraffin wax as described previously. This gave excellent results with all bearing combinations indicated above. In every case it was substantially equal to the best of all of the other blends. In other words, it gave a high average efficiency of operation in all cases tried.

TIMKEN MACHINE TESTS

These tests were carried out on all of the oils indicated above under strictly comparative conditions. For the details of the test see the Journal of the Society of Automotive Engineers, vol. 28, No. 1, page 53, article by E. Wooler.

In all cases the synthetic ester blends showed substantially as good results as the best of the other types of oil spoken of before and substantially better than unblended oil, but in the case of steel to cast iron the ester blend was superior to all others.

*Engine tests*

The tests described above while indicating generally the best products are not entirely conclusive and engine tests were resorted to to check actual performance. The actual engine "breaking in" tests were made under carefully controlled and comparable conditions. The time of running is 5 hours starting at an idling speed and increasing both speed and load for 4½ hours until a speed of 2000 R. P. M. at full load is reached. The last ¾ of an hour is run as follows:

30 minutes full open throttle, 2000 R. P. M.
15 minutes at speeds from 1000 to 2000 R. P. M.

increasing in steps of 200 R. P. M. After this test the engine is completely dismantled and all bearings are examined and rated arbitrarily; for example, if the piston is in perfect condition the rating is 6; if scratched, 4; for slight scoring the rating is 2; and if scored so badly as to make replacement necessary the rating is 0. The connecting rod bearings, wrist pins and rings are rated in much the same manner. Since individual inspectors may differ slightly it seems unnecessary to give a further description of the method. Suffice it to say that all of the bearings are rated according to an arbitrary and comparative system, and that the final rating is obtained as a general average of the condition of all parts of the engine. In order to avoid individual peculiarities of the inspector the tests given below are always given in comparison with a test made by the same inspector on a straight, unblended mineral oil.

|  | Engine condition, percent |
|---|---|
| Unblended oil—average of 4 tests | 50 |
| 2 tests with blend of synthetic esters of oxidized wax acids | 72.5 |
| 3 tests with sperm oil 2% | 50.8 |
| 2 tests with carbon tetrachloride blend | 37.6 |
| 5 tests 2% oleic acid blend | 73 |

The precision of the above tests is probably not better than 2 to 5%. In these tests, the engine condition is better as the percentage rating is higher. The color of the fatty acid blend oil after the test was extremely poor, but the ester blend and unblended oil were of extremely good color.

*Oxidation tests*

While the engine "breaking in" test is extremely important it does not give a sufficient indication of how the oil will stand long and severe service and for this reason oxidation tests were required. These tests were all carried out under strictly comparative conditions for 12 hours at a temperature of 400° F. by bubbling air through the oil at a rate of 5 cubic feet per hour with the following results:

| Oils | Sludge | Viscosity at 100° F. after test |
|---|---|---|
|  | Percent | Secs. Saybolt |
| Unblended oil | .45 | 420 |
| Blend of oxidized wax acid esters | .46 | 540 |
| Fatty oil (2% sperm oil) | .93 | 463 |
| Chlorine compound 2% carbon tetrachloride | 1.78 | 612 |
| Fatty acid synthetic 2% | 3.32 | 6843 |
| Oleic acid 2% | 7.78 | 1284 |

The above mass of comparative data is given because it is impossible to find one test which will completely indicate the performance of the oil. Some of these tests while considered individually might indicate that some particular compounding agent would give excellent results, but another test which must be given equal weight would indicate that it is of little or no value. It is only by comparing all of these tests that an accurate and unbiased picture of the results can be obtained. The following summary is submitted:

The chlorine-containing oils are unsatisfactory in steel to bronze, and steel to aluminum. The sulfur compounds are unsatisfactory in steel to bronze and cast iron to cast iron. The fatty acid blends while generally satisfactory in the Mougey or Timken tests, indicated considerably greater friction values in the case of cast iron to cast iron and steel to bronze than my ester blend and, while apparently giving very good results in "breaking in" tests, they are prone to form large amounts of sludge and to cause great thickening on oxidation indicating that they are not satisfactory for long service. Natural fats or fatty oils also appeared to be satisfactory on the Mougey and Timken tests, but they fell far below the operation obtained by the synthetic esters blend when used in actual "breaking in" tests and, furthermore, showed a considerably greater tendency toward sludging. The synthetic esters, on the other hand, showed results with the Mougey and Timken machines substantially equal or better than any of the others tested, for all bearing combinations tried. In the actual motor test these synthetic ester blends were equal to the best other oil, that is the oil containing a small amount of fatty acid and, furthermore, they were far superior to the fatty acid blend with respect to sludging and thickening on oxidation in which they were substantially equal to the unblended oil.

To further illustrate the types of oils herein contemplated, the following examples are submitted:

I

| Medium oil | 27.0 A. P. I. |
|---|---|
| Viscosity | 53 secs. Saybolt at 210° F. |
| Flash | 410° F. |
| Pour | −10° F. |
| Carbon | 0.1% | containing 2% of an isopropyl ester of acids produced by the oxidation of paraffin wax with air at a temperature from 100 to 150° C.

II

For "breaking in" service an oil 50 to 60 seconds Saybolt at 210° is used containing 4% of isopropyl esters referred to in Example I.

III

Oil similar to that referred to in Example II containing 4% of phenyl esters of the oxidized wax acids described in Example I.

IV

As an oil suitable for upper cylinder lubrication a highly refined hydrocarbon oil of the following characteristics is selected and to it is added about 2% of the isopropyl ester of oxidized paraffin acids. This oil can then be added to the gasoline tank in proportion of say 1 quart to about 10 gallons of gasoline.

| Gravity | 31 to 33° A. P. I. |
|---|---|
| Viscosity at 100° F. | 80 to 85 seconds Saybolt |

The esters of oxidized wax acids described herein are also substantially superior to synthetic esters prepared from the acids ordinarily found in vegetable oils, such as stearic acid, oleic acid and the like. This is indicated in the following example:

V

Tests under strictly comparative conditions were conducted on the Mougey machine described above with separate blends containing 2% of isopropyl stearate and 2% of isopropyl esters of acids (of similar boiling range to stearic acid) prepared by the oxidation of paraffin wax as described above, in a refined petroleum lubricating oil of the S. A. E. 20 grade. In these tests the isopropyl stearate blend showed a substantially higher friction value (indicated by the torque measurement) throughout the run than did the mineral oil containing isopropyl esters of oxidized wax acids, the friction value at maximum load of 25 weights for the isopropyl stearate blend being 125, while the friction value at the same load for the isopropyl esters of wax acids was 18; also a pronounced squeal, indicating improper lubrication, was observed at the 20th weight with the isopropyl stearate blend, while entirely satisfactory lubrication was secured throughout the run with the blend of oxidized wax acid esters.

In the above examples only a single blending agent is shown in connection with a straight mineral oil, but it will be understood that a mixture of esters may be readily used, or my esters may be used in combination with other substances such as the soaps of lime, soda, lead or other heavy metals, or they may be used in connection with a small excess of acids or the like. The lubricating oils used may also contain oxidation and corrosion inhibitors, sludge dispersers, pour point depressors, thickeners, viscosity improving agents and other blending agents suitable for increasing the quality and stability of the oil. Suitable inhibitors include oil soluble organic sulfides, phenols and amines, particularly the alkyl phenol thioethers and disulfides, such as tertiary butyl phenol thioether, tertiary amyl phenol disulfide, and the amines of more than six carbon atoms per molecule, such as toluidine, xylidine and benzidine. My ester blends are extremely stable, show little or no tendency to be lost by evaporation from the engine even though it may be run at exceptionally high temperatures. There appears to be a tendency for the amount of ester to gradually approach a certain end-value and if an excess is added it is gradually dissipated. It would be desirable to add this ester in the end concentration but this varies with different oils at different temperatures so that it is best to merely add the slight excess and allow the particular end-value to be reached as proper for the particular set of conditions. Under use the ester does not give rise to free acid in detectable amounts and in fact produces no greater amounts of acid than straight mineral oil used under comparable conditions.

This application is a continuation-in-part of my copending application Serial No. 600,828, filed March 23, 1932.

My invention is not to be limited by any theory of the mechanism by which these compounding agents increase film strength or decrease frictional resistance, nor to any particular synthetic ester or oil, nor to any particular amount, but only to the claims in which I desire to claim all novelty inherent in my invention.

I claim:

1. An improved lubricating oil comprising a viscous hydrocarbon oil containing a small amount of a synthetically prepared ester having a boiling point above 150° C. of a mixture of acids produced by the low temperature oxidation of paraffin wax.

2. Composition according to claim 1 in which said mixture of acids has a saponification number of about 250 and an acid number of about 200.

3. An improved lubricating oil comprising a viscous hydrocarbon oil and from 0.1 to 5.5% of a synthetically prepared ester having a boiling point above 150° C. of a mixture of acids produced by the low temperature oxidation of paraffin wax.

4. An improved lubricating oil comprising a viscous hydrocarbon and from 0.1 to 5.5% of a synthetically prepared ester having a boiling point above 150° C. produced from a low molecular weight monohydric alcohol and a mixture of acids produced by the low temperature direct oxidation of paraffin wax.

5. An improved lubricating oil comprising a viscous hydrocarbon oil containing a small amount of a synthetically prepared isopropyl ester having a boiling point above 150° C. of a mixture of acids produced by low temperature direct oxidation of paraffin wax.

6. An improved lubricant for automotive engines comprising a viscous hydrocarbon oil containing from 0.1 to 5.5% of an ester prepared synthetically from a monohydric alcohol and a mixture of monobasic acids, said acids being separated from the product of the air oxidation of paraffin wax, said ester containing only the elements carbon, hydrogen and oxygen, being free from acids and aldehydes, and having a boiling point above 150° C.

7. An improved lubricating oil for internal combustion engines, comprising a viscous hydrocarbon oil having a viscosity of about 45 to 150 seconds Saybolt at 210° F., and containing about 0.1 to 2.5% of isopropyl ester prepared synthetically from a mixture of acids separated from the partial oxidation product of paraffin wax, said ester being free from acid and sludging constituents and having a boiling point above about 150° C.

8. An improved lubricating oil particularly adapted for breaking in new internal combustion engines, which comprises a mineral oil having a viscosity of about 50 to 60 seconds Saybolt at 210° F., containing from about 2 to 5.5% of an isopropyl ester of a mixture of acids separated from a partial oxidation product of paraffin wax, said ester being free from acid and sludging constituents and having a boiling point above about 150° C.

9. An improved lubricating oil comprising a viscous hydrocarbon oil containing a small amount of an ester prepared synthetically from a mixture of acids separated from the product of the low temperature oxidation of paraffin wax, said ester being free from acid and sludging constituents and having a boiling point above about 150° C.

10. An improved lubricating oil comprising a viscous hydrocarbon oil containing a small amount of an ester prepared synthetically from a monohydric alcohol and a mixture of acids separated from a partial oxidation product of paraffin wax, said ester being free from acids and aldehydes and having a boiling point above about 150° C.

11. Composition according to claim 9 in which said mixture of acids is distillable with steam between 150° and 280° C. at an absolute pressure of 8 to 12 millimeters of mercury.

12. Composition according to claim 10 in which said acid is distillable with steam between 150° and 280° C. at an absolute pressure of 8 to 12 millimeters of mercury.

13. An improved lubricating oil comprising a viscous hydrocarbon oil containing a small amount of a synthetically prepared ester having a boiling point above 150° C. of a mixture of acids produced by the low temperature oxidation of high molecular weight semi-solid highly paraffinic material.

14. An improved lubricating oil comprising a viscous hydrocarbon oil and from 0.1% to 5.5% of a synthetically prepared ester having a boiling point above 150° C. produced from a low molecular weight monohydric alcohol and a mixture of acids produced by the low temperature direct oxidation of mineral oil fractions containing a major portion of paraffinic mineral wax.

15. An improved lubricating oil comprising a viscous hydrocarbon oil containing a small amount of an ester prepared synthetically from a mixture of acids separated from the product of the low temperature oxidation of mineral oil fractions containing a substantial proportion of paraffinic mineral wax, said ester being free from acid and sludging constituents and having a boiling point above about 150° C.

PER K. FROLICH.